United States Patent
Roosen et al.

(10) Patent No.: US 6,894,793 B1
(45) Date of Patent: May 17, 2005

(54) USER INTERFACE FOR AN INFORMATION PROCESSING SYSTEM, WITH JOB MONITORING

(75) Inventors: Monica M. W. M. Roosen, Venlo (NL); Johannes F. M. E. Geelen, Baarlo (NL); Frederik De Jong, Weert (NL); Theodoor J. M. Wilbers, St Tegelen (NL); Veronika Toumanova, Maastricht (NL); Janine D. Van Herwaarden, The Hague (NL)

(73) Assignee: Oce-Technologies B.V., Venlo (NL)

( * ) Notice: Subject to any disclaimer, the term of this patent is extended or adjusted under 35 U.S.C. 154(b) by 0 days.

(21) Appl. No.: 09/272,126

(22) Filed: Mar. 19, 1999

(30) Foreign Application Priority Data

Mar. 20, 1998 (NL) ............................................ 1008660

(51) Int. Cl.[7] ............................................ G06K 15/00
(52) U.S. Cl. ................... 358/1.15; 358/1.13; 358/1.14; 358/401; 358/434; 358/439
(58) Field of Search ..................... 358/1.2, 1.9, 1.13, 358/1.14, 1.15, 1.17, 1.18, 401, 434–439, 441, 442, 444; 399/8, 9, 10, 12, 81

(56) References Cited

U.S. PATENT DOCUMENTS

| 5,493,408 | A | * | 2/1996 | Kurogane et al. | ......... 358/1.15 |
| 5,727,135 | A | * | 3/1998 | Webb et al. | ................ 358/1.14 |
| 6,453,127 | B2 | * | 9/2002 | Wood et al. | .................... 399/8 |
| 6,469,796 | B1 | * | 10/2002 | Leiman et al. | ............. 358/1.15 |

* cited by examiner

Primary Examiner—Twyler M. Lamb
(74) Attorney, Agent, or Firm—Birch, Stewart, Kolasch & Birch, LLP

(57) ABSTRACT

In an information processing system including workstations and printers interconnected by a network, current collective status information of a set of print jobs of a user is displayed permanently in icon form on the screen of the workstation of the user. The status is presented as one of three possible states: (1) active: there is still at least one print job of the set not ready; (2) passive: all the jobs of the set are ready, or the set is empty; or (3) error: a job of the set has caused an error in the printer. The set can include all the print jobs of a user, or a selection thereof. In response to a double mouse click on an icon, extensive information concerning the print jobs of the set to which the icon relates is displayed. As an alternative to permanent presentation in icon form, presentation can also be in the form of messages on the screen at the user's workstation when the status of the set changes.

30 Claims, 7 Drawing Sheets

USER INTERFACE FOR AN INFORMATION PROCESSING SYSTEM, WITH JOB MONITORING

BACKGROUND OF THE INVENTION

1. Technical Field of the Invention

The invention relates to an information processing system with workstations and printers interconnected by a network, and more specifically to a user interface for the communication process between a workstation and the printers, whereby the status of the print jobs can be monitored.

2. Description of Related Art

A user can obtain the status of print jobs in a conventional information processing system by inspecting the print queue. For this purpose, the printer application has to be called up and this then displays the complete queue of print jobs still waiting. This is inconvenient if a user wishes to be permanently informed of the state of his print jobs, while he is occupied with other work at his workstation.

It is therefore desirable to offer a mechanism whereby a user can obtain adequate information concerning the status of his print jobs at his workstation screen, without other work being interfered with. It is also desirable for the status information to be displayed in compact form.

SUMMARY OF THE INVENTION

The invention provides a solution to these problems, by providing a workstation with a program personalised for a specific user for communication with a printer for sending print jobs to said printer and calling up or receiving status information from the printer. The program of invention includes the following processes:

collecting information concerning the status of print jobs of the user from at least one printer maintaining an actualised overview of the print jobs of the user, and displaying on the workstation screen the current collective status of a predetermined set of print jobs of the user.

Since the status is displayed for a set of print jobs simultaneously, the user can nevertheless have an impression of how his jobs are progressing, particularly when he can go to the printer in order to fetch his prints.

The collective status recognises a number of possible states, a first mode in which at least one job has not yet been finished, a second in which all the jobs of the set have been finished or in which the set contains no jobs whatsoever, and a third in which one of the print jobs of the user has caused an error in the printer.

The set can contain all the print jobs of the user, or alternatively a selection thereof, made up by the user himself. The set can also be limited to all, or to a selection of all, the print jobs of the user present in a specific printer.

The status information is dynamic, both in that new print jobs can be added to the monitored set and in that the presented status is actualised, i.e. always revised in the event of changes in the status.

In one embodiment of the invention, in the event that the collective status of a set of print jobs is presented as being of the first state, the number of print jobs that have not yet been carried out is also presented on the workstation screen.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
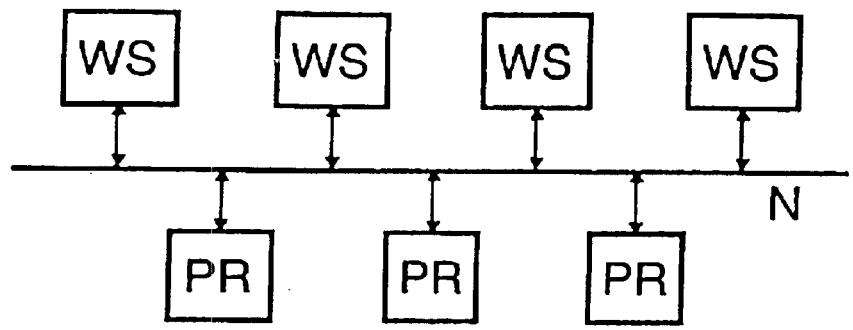
FIG. 1 shows an information-processing system in which the invention is situated.

FIG. 1 shows a system of workstations WS and printers PR connected by a local network N. The workstations are, for example, PC's and are in each case equipped with a processing unit, a screen, a keyboard and a mouse. The printers are digital copying machines, each including a scanner, a printer, an operator control unit and a connection unit (Digital Access Controller or DAC) for connection to the network and processing print jobs sent from the workstations. In addition, it is possible to use machines which only have a printer function but also have a control system adapted to the functionality described hereinafter. All these machines, copying machines and printers, are hereinafter referred to as "printer". Users wishing to have a specific data file printed from their workstation, can for the purpose choose from a number of, or even all, the printers of the system.

For the purpose of communication with the printers and the presentation of information relating thereto to the users, there is operative in each connected workstation a program which is hereinafter referred to as "desktop software". This program is personalised, i.e., it works on the instructions of just one user who on starting up has identified himself and input his authorisation code.

The desktop software, hereinafter also referred to as "desktop" for short, is built up from a number of subprograms diagrammatically illustrated in block 100 in FIG. 2. The core of the desktop software is formed by a subprogram indicated by "virtual printer", which communicates with the connected printers and updates the properties and status of each of these insofar as this is of interest to the workstation user.

As will be explained in the following description, a user can choose how much information he wants to have presented concerning the state of connected printers and the printing files to be processed thereon and at what time. The exchange of data concerning these matters between the desktop software and the printers is limited to what is essential for the user's requirements. This prevents the network from being loaded more than is necessary and, in addition, the processing capacity of the workstation is not loaded more than necessary, since only the relevant information is present in the workstation and has to be processed.

The "virtual printer" program is provided with an operator control program, hereinafter referred to as "user interface"

(UI), which controls the communication between the user and the desktop software in a manner understandable to the user, in the form of key strokes on the keyboard and windows on the screen, in which windows information is presented and in which the user can select and control the operation of elements via mouse movements. The desktop software is also provided with a communication program COM for controlling data transport from and to the printers via the network.

Figure 2:
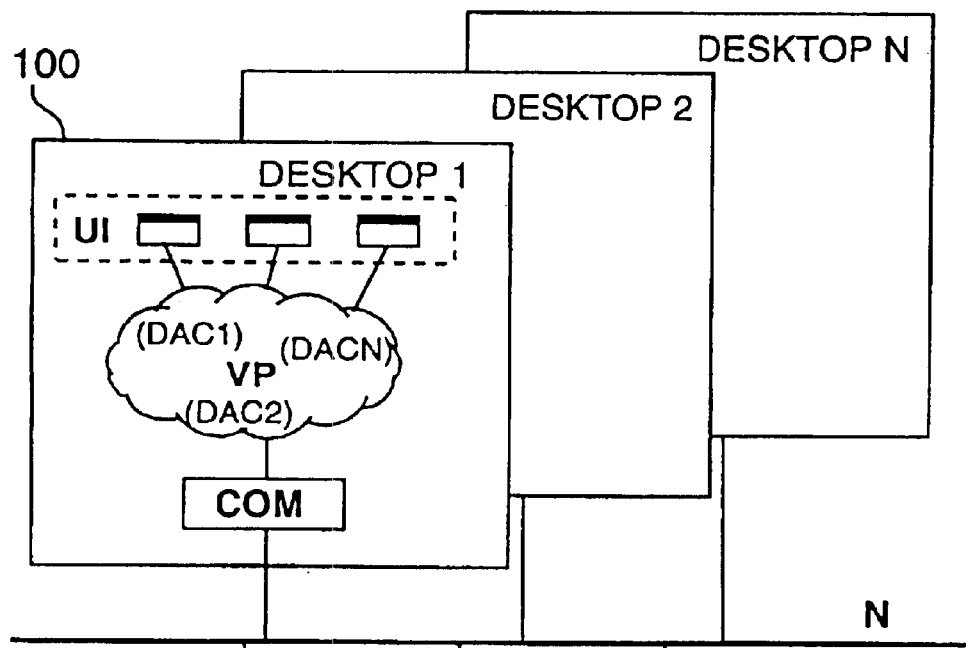
FIG. 2 is a diagrammatic overview of the software according to the invention.
Figure 2:
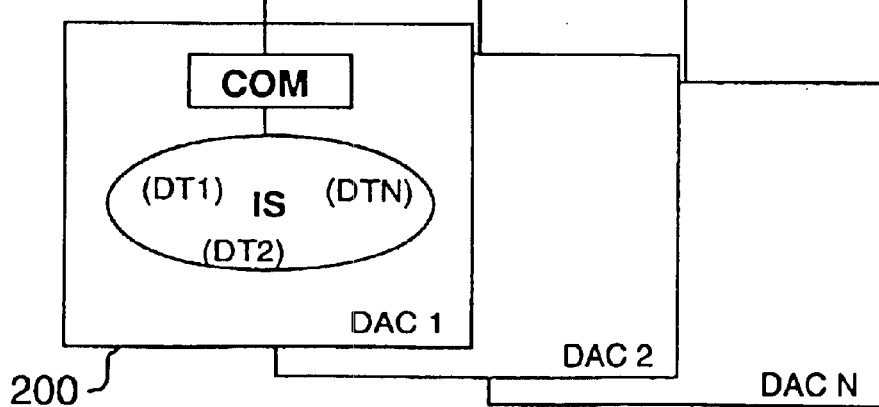

Block 200 in FIG. 2 gives a diagrammatic illustration of the communication software in the DACs of the printers. This is formed particularly by an "information server" IS, which is intended to receive from and send to workstations digital information such as status information concerning the printer itself and the print jobs that the printer is processing. The information server updates data concerning the information required by each desktop and transmits only that information which is really required, and at the time at which it is required. The information server is also provided with a communication program COM for controlling data transport from and to the desktops via the network.

Files of digital data which are transmitted to a printer via the network for printing by the printer are either of a first or a second type. Files of the first type, hereinafter referred to as automatic print jobs, are required to be printed directly, i.e. without further action by an operator at the printer, while files of the second type, hereinafter referred to as interactive print jobs, must only be stored in the printer memory and must not be printed until an operator at the printer explicitly so requests there by selection with the aid of the operator control means. An attribute added to the file shows the type of file involved.

Processing of a data file of the first type is referred to in this description as automatic printing (AP).

Processing of a data file of the second type is hereinafter referred to as interactive printing (IP). The procedure with this is as follows.

A data file for printing by interactive printing and transmitted by a workstation via the network is received by the DAC. This extracts from the file a number of predetermined identification data, such as the name of the owner and the name of the file itself. The file is then stored unchanged on a storage unit, e.g. a hard disk, in the printer, whereafter the machine passes to the stand-by state in respect of this job.

The DAC manages an administration system containing the identification data of all the data files for printing which are stored. If a new file is supplied via the network, the DAC adds the identification data thereof in the name of the owner/sender to the administration system.

The disk together with the said administration system of the DAC form, as it were, a set of "logic storage spaces" for data files, each logic storage space being allocated to one user. Thus in actual fact storage in a user's logic storage space means that the file is stored on the disk and registered in the administration system in the name of that user. A logic storage space can be protected by a code specific to the owner/user, i.e. in practice an operator can obtain information over the files stored in a specific logic storage space only after he has input this code via the operator control means of the printer.

If an operator now wishes to have a specific interactive print file printed, then he must select that file by means of the printer operator control panel and give a print command by actuating a start key. In response thereto the data file is brought up from the disk and converted to printable data, which are processed by the printer to form a print. An interactive print file can be protected by the sender by means of a code. This code is in the form of an attribute to the print file. If a user wishes to print this file interactively, he must key in the security code at the operator control panel before the file is printed.

When a data file has been interactively printed, it remains in principle stored on the disk and registered in the administration system until it is removed by the user himself or by the printer manager.

The printer manager can bring the machine into a mode in which automatic print jobs are not accepted. In that case, incoming automatic print jobs are converted by the printer into interactive print jobs and stored on the disk.

As already stated, at least a number of the printers in this system are in fact digital copying machines, which can also make a copy of an original document by scanning it and printing the digital image data generated thereby.

There are therefore jobs which are started by a user at the machine itself (copy jobs and interactive print jobs) and jobs which are fed from a distance, e.g. from a workstation (PC) (an automatic print job). In the former case, the printer operates in a command-controlled mode in which the machine starts a reproduction process in response to a start command from the operator control panel, while in the latter case it operates in an autonomous mode in which the machine starts a reproduction process on its own initiative.

A user who has gone to the machine in order to start a job there by means of the keys finds it very frustrating if a remote-started automatic print job begins just before he wants to start his job. He then has to wait until the remote-started job is finished, or he must at least interrupt that job by means of an "interrupt" mechanism, before he can make his copy. This frequently occurs in practice, particularly at a machine which is frequently used, and results in annoyance and delay.

In order to protect the position of the user at the machine as much as possible, the machine passes into the command-controlled mode in response to a physical interaction by an operator at the machine, and/or remains there for a predetermined first waiting period. During this waiting period, the machine cannot pass into the autonomous mode. This offers the user at the machine the opportunity of creating, by any interaction, e.g. by actuating a key or placing one or more documents in the machine feed tray, time for himself in order to start his job unhurriedly.

In addition, on completion of the execution of a job in the command-controlled mode, the machine remains in the command-controlled mode for a predetermined second waiting time.

Thus if the user wishes to process further copying or interactive print jobs, he will not be overtaken by an automatic print job. Also during the second waiting period, the machine cannot pass to the autonomous mode. The second waiting period can be equal to the first. A practical value for waiting periods is, for example, 30 seconds to 2 minutes.

The above-mentioned desktop software will now be described further.

The desktop software includes the following modules:

An overview of all available connected printers with an indication of their status (hereinafter referred to as: Devices Overview)

An overview of current print jobs with the possibility of intervening in the settings for each job (hereinafter referred to as: Job Control)

Information provision concerning the progress of current print jobs (hereinafter referred to as: Job Monitoring).

The mode information presented by the three modules of the desktop software is dynamic, i.e. it is adapted directly as soon as there is any change in the presented mode.

It should again be noted that the desktop software is personalised and that the information provision and control possibilities are therefore directed towards the wishes of one specific user.

The three program modules referred to can be started from a general start menu which appears when the desktop software is selected on the workstation screen, and will now be described in sequence.

Figure 3:
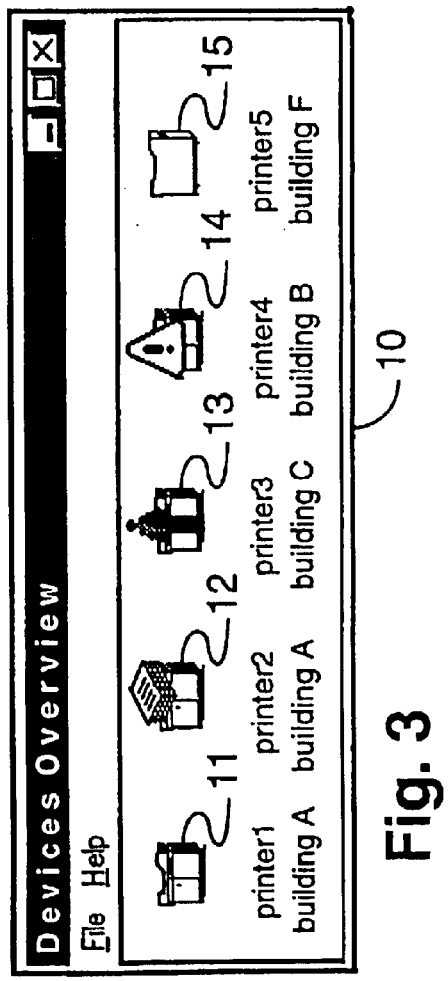
FIGS. 3 to 13 show information windows displayed by the software according to the invention on the workstation screen.

FIG. 3 shows a window 10 which is displayed on the workstation screen after the user has selected the option "Devices Overview" in the desktop software. This window displays for each printer a symbol indicating the status of that printer. Examples of this are shown in FIG. 3. In addition, each symbol has a short description of the printer so that it is clear which printer is involved.

A first symbol 11 is a stylised illustration of the printer. This symbol indicates that the printer in question is available for print jobs and is at the moment idle. A second symbol 12 shows the printer with a stack of papers over it and indicates that this machine is occupied with an automatic print job in the autonomous mode. Symbol 13 shows the printer with a person in front of it, to indicate that the machine is in the command-controlled mode and hence either occupied with a copy job or an interactive print job or is in the above-described first or second waiting period, in which no automatic print jobs can start. Symbol 14 is an illustration of the printer with, superimposed thereon, a notice board indicating that this printer is in a malfunction state. Symbol 15 is an undetailed illustration of the printer to indicate that this printer is connected but at the present time is not available for copy jobs or print jobs.

From these symbols a user can determine which printer he should send his print job to, and also, when he wishes to carry out a copying or interactive print job, whether the chosen machine is free. Particularly convenient is the differentiated indication of the occupied state, i.e. occupation in the autonomous mode and occupation in the command-controlled mode, because an automatic print job can without difficulty be stopped during operation by a user at the machine, in order to carry out a copy job or interactive print job in an "interrupt" mode, but passing another user at the machine will always require more convincing reasons.

The user can select one of the symbols, and hence one of the printers, and then call up one of the following functions either with a menu in the top bar of the window or with a popup menu or the right-hand mouse button:

Displaying the waiting print jobs for the printer concerned; in this function automatic and interactive print jobs are displayed separately and they can also be manipulated. This function forms part of the "Job Control" program module and will be described in detail there. This function can also be called up with a double mouse click on the printer symbol.

Displaying the properties and status of the printer concerned.

Calling up a monitor function which during the work gives information on the display screen concerning the status of the printer concerned.

Defining the printer concerned as the default printer.

Figure 4A:
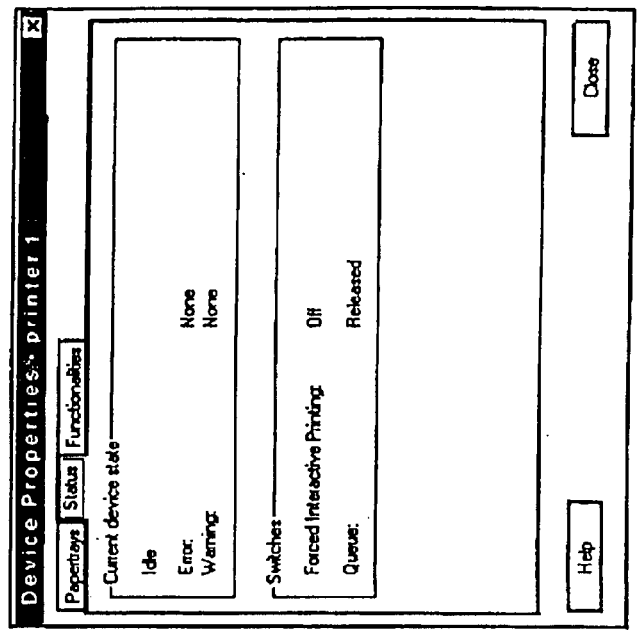
Figure 4B:
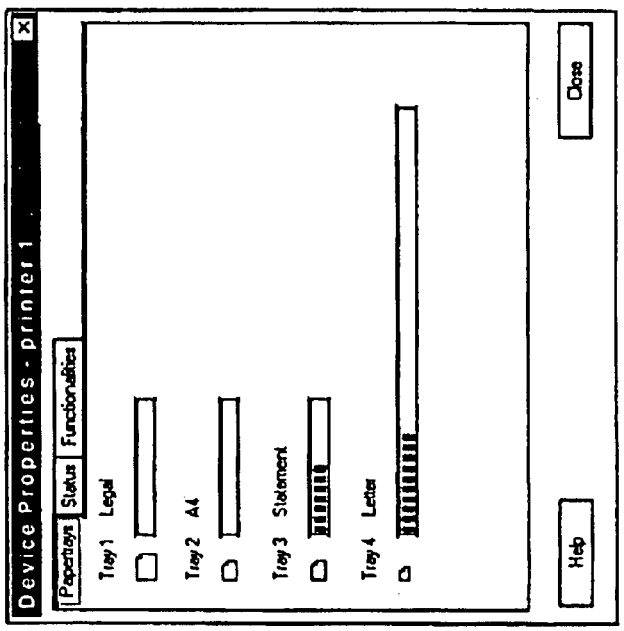

In the above-mentioned function in which the properties and status of the printer are displayed, a window with this information appears on the screen, the information being distributed over three tab cards which can be made visible by selection of their tab, as shown in FIGS. 4A, B and C. The stock of printing paper in the printer trays is displayed on a first tab card, the current state of operation of the printer is described on the second tab card and information as to the installed functionality is shown on the third tab card.

Figure 5:
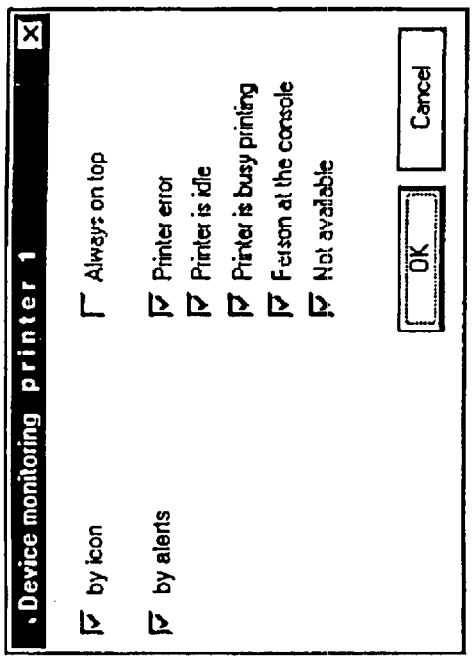

In response to selection of the above-mentioned monitor function, the workstation screen shows a window in which the user can set his preferences for the form of presentation of the printer status data (see FIG. 5). There are two main forms of presentation, namely with a permanent icon on the screen ("by icon") and with messages which appear on the screen at the time that a change of printer status occurs ("by alerts").

Figure 6B:
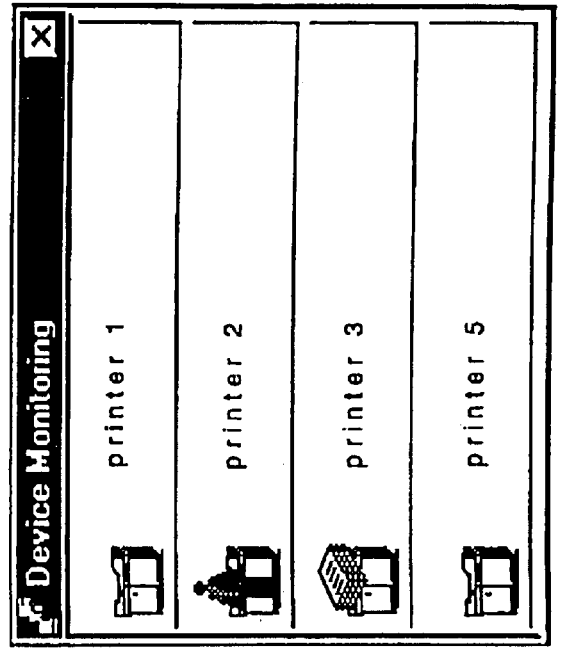
Figure 4C:
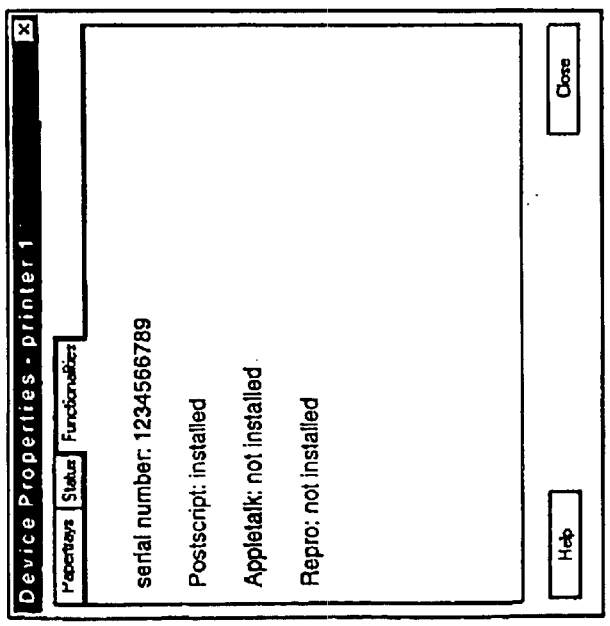
Figure 6A:
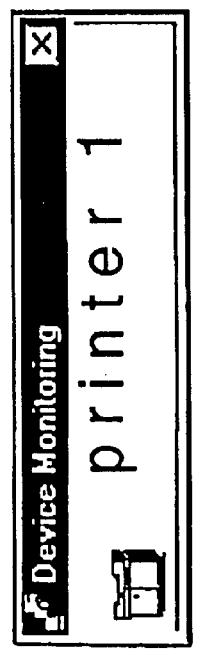

When monitoring with icons is set, the icon displays a symbolic illustration of the status just as shown in FIG. 3. An example of such an icon is given in FIG. 6A. A user can also simultaneously have the status of different printers maintained. In that case, the screen shows an icon for each monitored printer as shown in FIG. 6B. By a double click of the mouse on an icon the function of displaying the waiting print jobs for the printer concerned is called up. In this connection we would again refer to the description of the "Job Control" program module.

Figure 7:
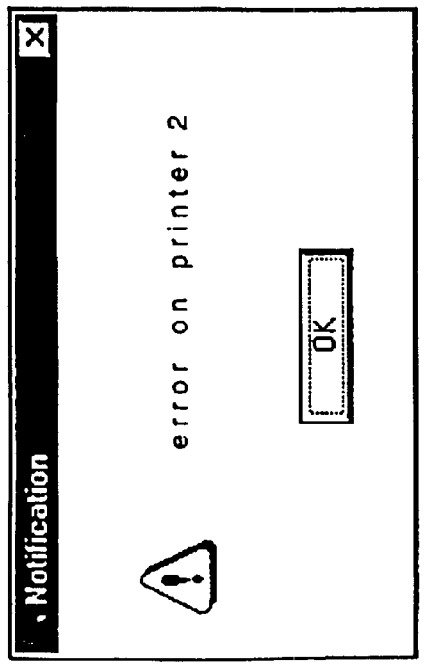

When monitoring is by means of messages, the user can indicate the changes of state for which he wants to receive a message, in order thus to avoid unnecessary reports. An example of a message of this kind is displayed in FIG. 7.

Figure 8:
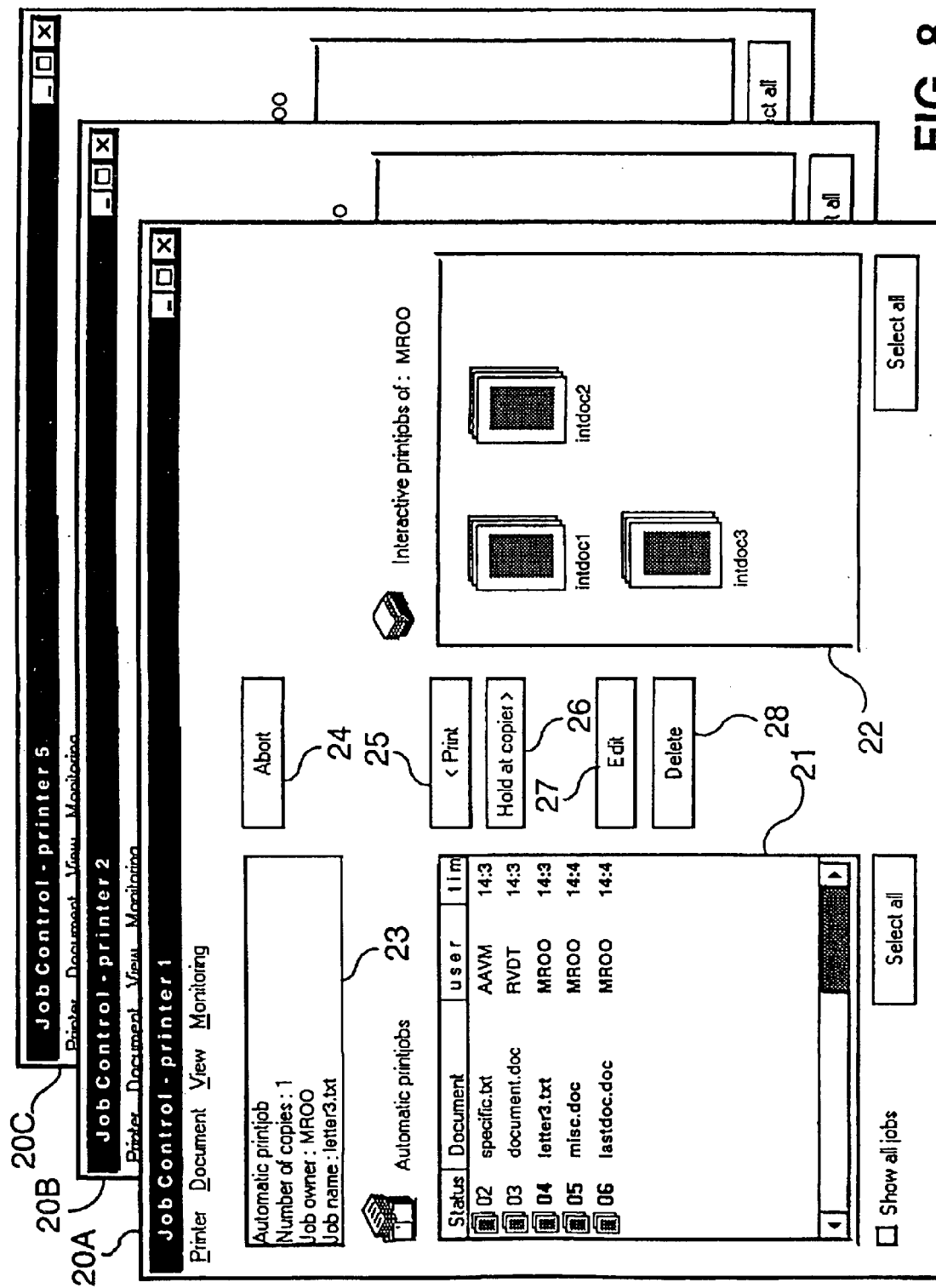

FIG. 8 shows the relevant layout of the workstation screen after the user has selected the "Job Control" option in the desktop software to maintain an overview of current print jobs.

Here a number of windows 20A, B and C are displayed, each applicable to a printer at which a print job of the user is present at that time. Thus there are as many windows displayed as there are printers at which the user's print jobs are present at that time. If this function was called up from the "Device Overview" module, then only the window for the printer selected there would be displayed.

A window 20 contains a space 21 for automatic print jobs, a space 22 for interactive print jobs of the user, and a space 23 for specifying the active print job. There are also a number of "keys" which can be operated via the mouse.

Space 21 contains the queue of automatic print jobs of the user, with their status (number in the queue), name, and other data to be selected by the user during set-up. By clicking on a switchbox on the left beneath the space 21 the user can also have displayed all the waiting automatic print jobs, i.e. including those of other users. In that case his own jobs are reproduced in a manner which is distinguishable from the others, for example in colour. If the Job Control module is called up from the "Devices Overview" module, for a specific printer, the presentation of all the waiting automatic print jobs, i.e. including those of other users, is the default setting.

Space 22 contains an overview of waiting interactive print jobs of the user, here reproduced with icons with a name, which corresponds to the character of the jobs, which are not in a queue but do not become operative until the user starts them on the operator control panel. To obtain more information concerning these jobs, the user can also have them presented in a detailed list.

Space 23 displays the data of the print job which is active at that time, or, if there is no job active, the state of the printer ("idle", "error"). The space contains the following data: type of job (copying job, automatic print job, interactive print job), number of prints, name of the owner of the job, and the name of the job. Next to the space 23 is a key 24, by means of which the active job can be discontinued ("abort").

By means of the key 25, an interactive print job selected in the space 22 can be converted to an automatic print job and be added to the queue in space 21, while the key 26 can convert an automatic print job selected in space 21 into an interactive job and move it to space 22.

By means of key 27, the print settings can be displayed for a print job selected in either of the spaces 21 or 22. The same effect is achieved by double clicking of the mouse on the job name. In response to this, a window is opened on the screen of the workstation, displaying all the settings. The settings can also be changed in this window.

Finally, a print job selected in either of the spaces 21 or 22 can be removed by means of key 28.

The above functions can also be called up by selecting a job and choosing from the "document" menu in the menu bar above the window 20 or by selecting in a pop-menu which appears when the right-hand mouse button is clicked on a job name.

The functions explained with reference to the keys 24–28 can be used by the user only for his own print jobs.

The "View" menu in the menu bar above the window 20 offers the following options:

- Selection of the form of presentation of automatic print jobs (choice of which information is displayed)
- Selection of the form of presentation of interactive print jobs (as icons or in a list and, if a list is chosen, what information is displayed)
- Display of all print jobs of the user (over all the printers), with the printer on which the job is present, plus this information concerning the print jobs that have already been finished.

Figure 9:
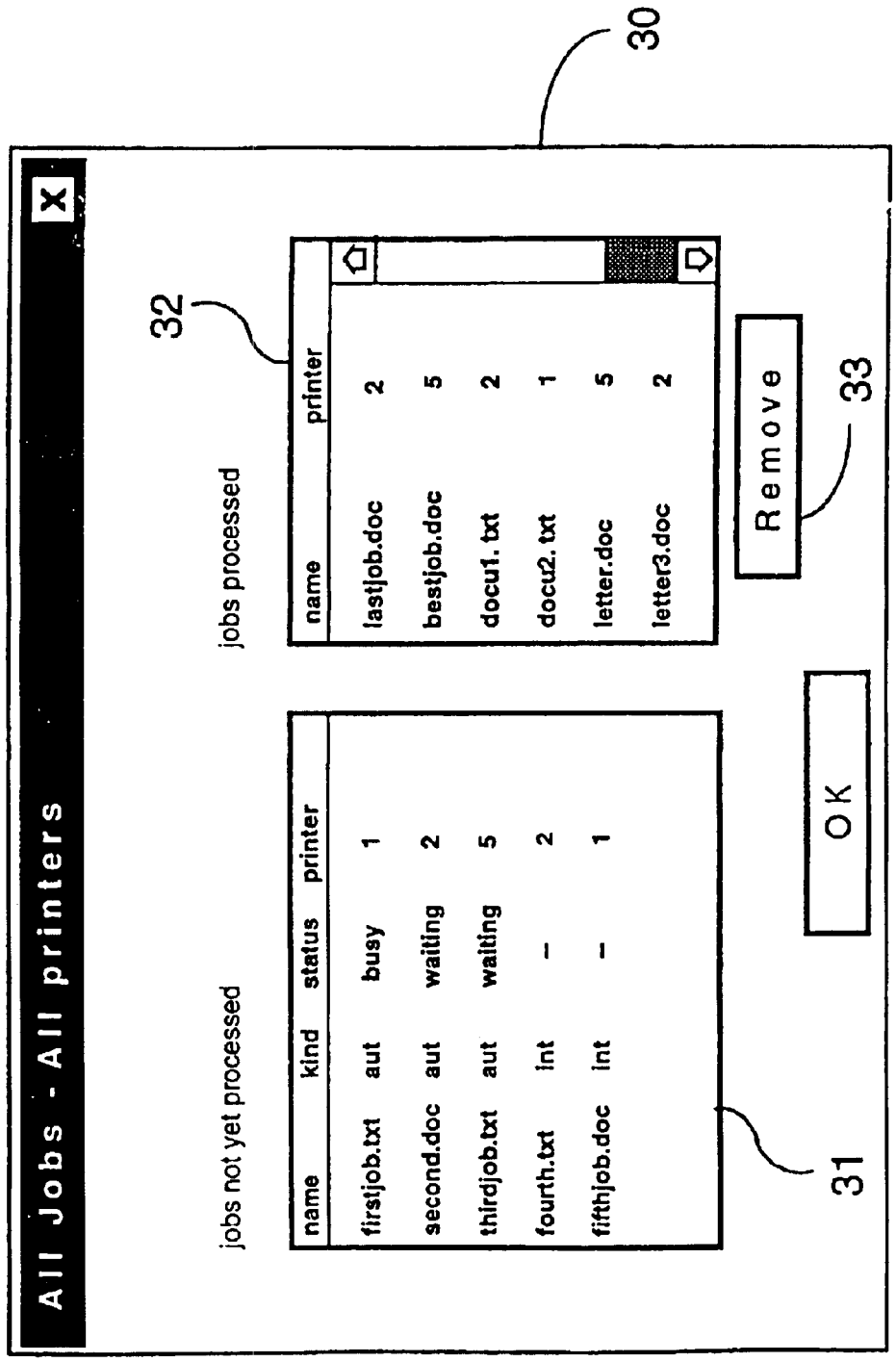

This latter function will now be explained with reference to FIG. 9.

When this function is selected, the screen at the workstation displays the window 30. This window 30 contains a space 31 in which there is displayed a list of all the print jobs which have not yet been finished for the user concerned, on all the printers, with their status (waiting, busy, error) and the printer at which they are present. This list shows both automatic and interactive print jobs and their type. Double clicking of the mouse on the name of a print job in space 31 opens the Job Control window (FIG. 8) of the printer where the job is present, so that the user can see the status of the job in the queue (if it is an automatic print job), can manipulate the job, and can inspect and/or change the print settings.

The window 30 also contains a space 32 displaying a list of all the finished print jobs of the user concerned, on all the printers, with the printer which processed them. A key 33 is provided beneath the space 32 to enable the user to remove from the list a print job after he has selected this by clicking with the mouse.

If a list is too long in space 31 or 32 to fit in that space, a scroll bar appears so that the jobs not fitting in the window can still be reached.

The list of finished print jobs in space 32 can also give a status indication although this is not shown here. In the case of a printer with more than one delivery tray, the printer machine control system knows the delivery tray in which the prints have been deposited and this information can be displayed in the list. The printer can also be provided with sensors to determine whether there are prints in the delivery trays. In that case, the machine control system can also note that a delivered stack of prints is taken from the tray. This information can also be displayed in the list in space 32. The status information can have the form of: "present in delivery tray X", or "removed".

By means of this function a user can always find out where his print jobs are in the queue or where his prints are situated, this being extremely convenient particularly in an environment in which a number of printers are used.

The monitor function can also operate for just a specified sub-set of all the printers in the system. This can be set when the system is configured, or by means of a set-up function of the program.

The "monitor" menu in the menu bar above the Job Control window 20 offers the opportunity of activating a monitor function for the print jobs of the user concerned on the printer concerned. This function can also be called up from the start menu of the desktop software and will be described hereinafter.

The monitor function is intended to keep the user informed as to the status of his automatic print jobs. It can be operative for all the current jobs or for some of the jobs, as selected by the user.

The monitor function has three modes:

- A first mode ("active"): there is still at least one job of the set which has not been completed; also included is the number of jobs that have not yet been finished.
- A second mode ("passive"): all the jobs of the set have been finished or the set is empty.
- A third mode ("error"): one of the jobs has caused an error.

Figure 10:
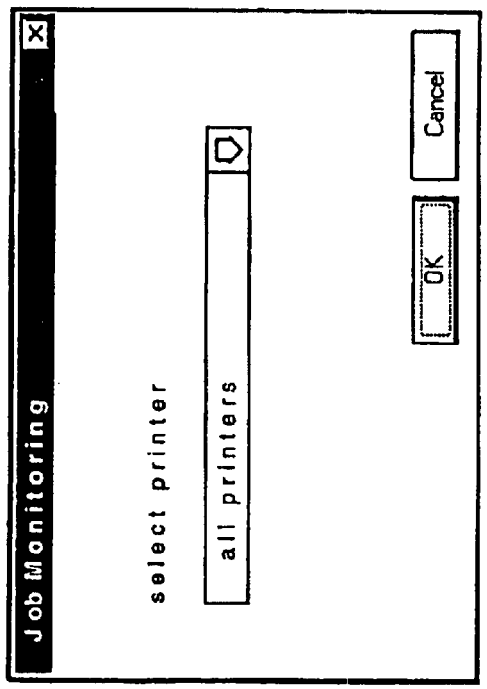

In response to the selection of the monitor function in the start menu of the desktop software, the workstation display screen displays a window in which the user can select one, more, or all the printers for the monitor function. This is shown in FIG. 10. After the user has clicked the "OK" key with the mouse, the workstation display screen displays a window in which the user can set his preferences for the form of presentation of the status of his personal print jobs (see FIG. 11). There are two main forms of the presentation, namely by using a permanent icon on the screen ("by icon") or by using messages which appear on the screen when there is any change in that status ("by alerts"). In the latter case the user can indicate the changes of status for which he wants to receive a message in order thus to avoid unnecessary reports.

The user inputs his preferences and presses the "OK" key, whereafter the function is activated. An icon now appears on the screen if the icon mode was selected.

Figure 11:
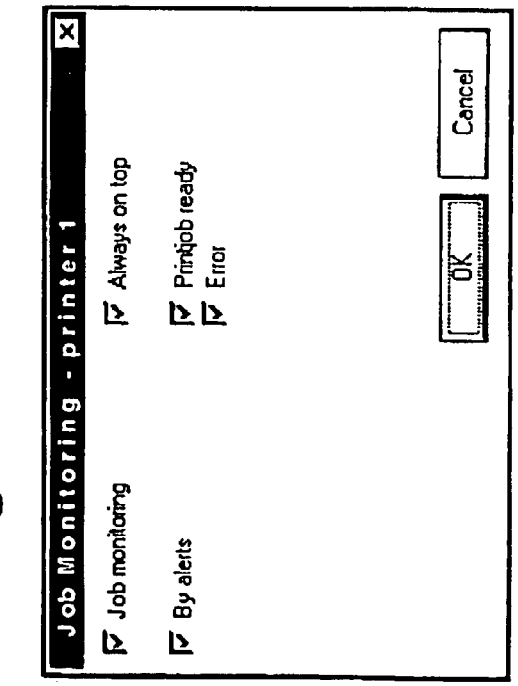

When Job Monitoring is activated from Job Control, the selection window of FIG. 10 is skipped (the printer of the Job Control window is automatically selected), but the window of FIG. 11 is immediately displayed.

Figure 12:
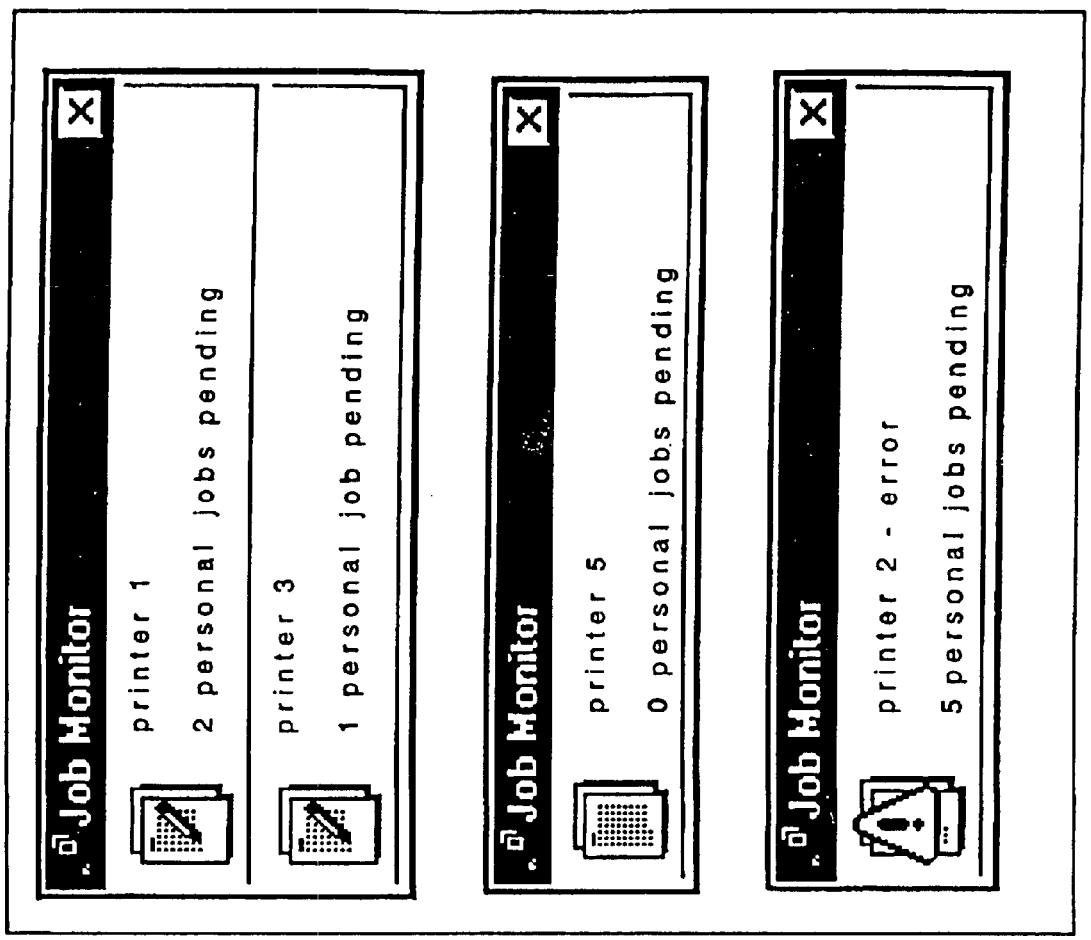

FIG. 12 shows monitor icons. In addition to the name of the printer for which it is active, an icon contains a symbol showing the status of a set of print jobs of the user on that printer. In this example, the following symbols are displayed for the above-mentioned three states:

- For the first state ("active"): an illustration of a document with a pen;
- For the second state ("passive"): an illustration of a document;
- For the third state ("error"): a notice board in front of a document.

The set of print jobs monitored by the monitor function can be the complete set of jobs on the printer concerned, but it can alternatively be a sub-set. This sub-set can only be selected in the Job Control window 20, space 21, by clicking the required print jobs with the mouse, followed by clicking the monitor menu in the menu bar. When Job Monitoring is called up from the start menu of the desktop software, the set always contains all the jobs. The monitor function is dynamic: print jobs can be added to a monitored set.

In response to a double click of the mouse on a monitoring icon, the Job Control window of the printer concerned is opened, so that the user can inspect the complete status of his jobs.

A plurality of icons can also be displayed simultaneously on the screen, so that the user can inspect the status of different sets or printers simultaneously.

Figure 13:
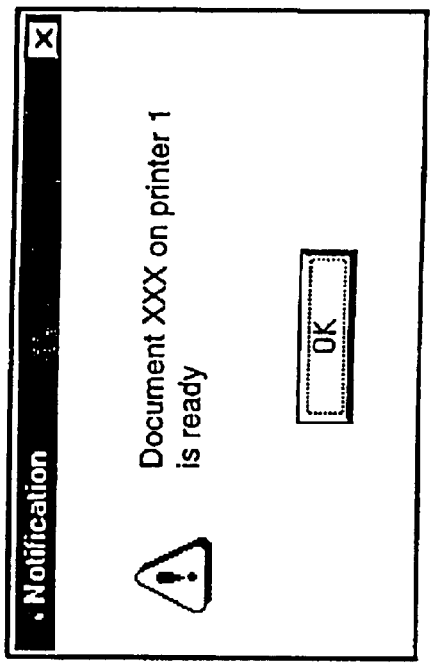

If the "by alerts" mode is selected, message windows appear only if there is a user-selected change of status of a print job from the set. An example of such a window is shown in FIG. 13.

The invention being thus described, it will be obvious that the same may be varied in many ways. Such variations are not to be regarded as departure from the spirit and scope of the invention, and all such modifications as would as would be obvious to one skilled in the art are intended to be included within the scope of the following claims.

What is claimed is:

1. An information processing system, comprising:
    at least one workstation provided with a processor unit, a screen, and an operator control device,
    at least one printer, provided with a control unit and an operator control panel, and
    a digital network to which the at least one workstations and the at least one printers are connected,
    wherein a workstation is provided with a program personalized for a specific user for communication with a printer for sending print jobs to said printer and calling up or receiving status information from said printer,
    said program including
        means for collecting information concerning the status of print jobs of the user from at least one printer,
        means for maintaining an actualized overview of the print jobs of the user,
        means for determining and updating a single collective status of a predetermined set of print jobs of the user on the basis of said actualized overview, and
        means for displaying on the workstation screen a display element indicating said collective status.

2. The system according to claim 1,
    wherein said program identifies a current collective status of a set of print jobs as a first state, if at least one print job of the set has not yet been carried out.

3. The system according to claim 1,
    wherein said program identifies a current collective status of a set of print jobs as a second state when all the print jobs of the set have been carried out.

4. The system according to claim 3,
    wherein said program also identifies the current collective status of a set of print jobs as the second state if the set in question is empty.

5. The system according to claim 1,
    wherein said program identifies a current collective status of a set of print jobs as a third state if an error occurs in carrying out a print job of the set.

6. The system according to claim 1,
    wherein the set includes all the print jobs of a user.

7. The system according to claim 1,
    wherein the set contains all the print jobs of a user which have been sent to a specific printer.

8. The system according to claim 1,
    wherein the set is formed by a selection from all the print jobs of a user.

9. The system according to claim 8,
    wherein the selection is restricted to a selection from the print jobs of a user which have been sent to a specific printer.

10. The system according to claim 1,
    wherein the set of print jobs whose current collective status is presented by said program is expanded dynamically when a new print job is added thereto and sent to a printer.

11. The system according to claim 6,
    wherein the set of print jobs whose current collective status is presented by said program is expanded dynamically when a new print job is added thereto and sent to a printer.

12. The system according to claim 7,
    wherein the set of print jobs whose current collective status is presented by said program is expanded dynamically when a new print job is added thereto and sent to a printer.

13. The system according to claim 8,
    wherein the set of print jobs whose current collective status is presented by said program is expanded dynamically when a new print job is added thereto and sent to a printer.

14. The system according to claim 9,
    wherein the set of print jobs whose current collective status is presented by said program is expanded dynamically when a new print job is added thereto and sent to a printer.

15. The system according to claim 2,
    wherein in the event that the collective status of a set of print jobs is presented as being of the first state, the number of prints jobs not yet carried out is also presented on the workstation screen.

16. The system according to claim 1, wherein the display element indicating said collective status is a single icon.

17. The system according to claim 1, wherein the means for determining and updating consolidates print job status information of all print jobs from the predetermined set of print jobs of the user on the basis of said actualized overview, and keeps said collective status updated.

18. A method of processing information in a system, wherein the system includes at least one workstation provided with a screen, at least one printer, and a digital network to which the at least one workstations and the at least one printers are connected, wherein a workstation is provided with a program personalized for a specific user for communication with a printer for sending print jobs to said printer and calling up or receiving status information from said printer, the method comprising the steps of:
    collecting information concerning the status of print jobs of the user from at least one printer;
    maintaining an actualized overview of the print jobs of the user;
    determining and updating a single collective status of a predetermined set of print jobs of the user on the basis of said actualized overview; and
    displaying on the workstation screen a display element indicating said collective status.

19. The method according to claim 18, wherein said determining step includes the step of:
    identifying a current collective status of a set of print jobs as a first state, if at least one print job of the set has not yet been carried out.

20. The method according to claim 18, wherein said determining step includes the step of:

identifying a current collective status of a set of print jobs as a second state when all the print jobs of the set have been carried out.

21. The method according to claim 18, wherein said determining step includes the step of:

identifying a current collective status of a set of print jobs as a third state, if an error occurs in carrying out a print job of the set.

22. The method according to claim 18, wherein the set is formed by a selection from all the print jobs of a user.

23. The method according to claim 18, wherein the set of print jobs whose current collective status is presented is expanded dynamically when a new print job is added thereto and sent to a printer.

24. The method according to claim 19, wherein the displaying step also presents on the workstation screen the number of prints jobs not yet carried out, in the event that the collective status of a set of print jobs is presented as being of the first state.

25. The method according to claim 18, wherein in the displaying step, the display element indicating said collective status is a single icon.

26. The method according to claim 18, wherein the determining and updating step includes:

consolidating print job status information of all print jobs from the predetermined set of print jobs of the user on the basis of said actualized overview, and keeping said collective status updated.

27. A computer program product embodied on at least one computer readable medium accessible by a system for processing information, the system including at least one workstation provided with a screen, at least one printer, and a digital network to which the at least one workstations and the at least one printer are connected, wherein a workstation is provided with a program personalized for a specific user for communication with a printer for sending print jobs to said printer and calling up or receiving status information from said printer, the computer program product comprising computer-executable instructions for:

collecting information concerning the status of print jobs of the user from at least one printer;

maintaining an actualized overview of the print jobs of the user;

determining and updating a single collective status of a predetermined set of print jobs of the user on the basis of said actualized overview; and displaying on the workstation screen a display element indicating said collective status.

28. The computer program product according to claim 27, wherein said computer-executable instructions for determining include computer-executable instructions for:

identifying a current collective status of a set of print jobs as a third state, if an error occurs in carrying out a print job of the set.

29. The computer program product according to claim 27, wherein the display element indicating said collective status is a single icon.

30. The computer program product according to claim 27, wherein the computer-executable instructions for determining and updating include computer-executable instructions for:

consolidating print job status information of all print jobs from the predetermined set of print jobs of the user on the basis of said actualized overview, and keeping said collective status updated.

* * * * *